C. A. MATHESON.
DRYING APPARATUS FOR PEAT AND THE LIKE.
APPLICATION FILED AUG. 13, 1909.

957,232.

Patented May 10, 1910.

WITNESSES

INVENTOR
C. A. MATHESON
BY
ATTY

UNITED STATES PATENT OFFICE.

CHARLES ALBERT MATHESON, OF PERTH, ONTARIO, CANADA, ASSIGNOR TO GEORGE BAXTER FARMER, OF PERTH, CANADA.

DRYING APPARATUS FOR PEAT AND THE LIKE.

957,232.  Specification of Letters Patent.  Patented May 10, 1910.

Application filed August 13, 1909. Serial No. 512,631.

*To all whom it may concern:*

Be it known that I, CHARLES ALBERT MATHESON, of Perth, in the county of Lanark, Province of Ontario, Canada, have invented certain new and useful Improvements in Drying Apparatus for Peat and the Like, of which the following is a specification.

My invention relates to improvements in drying apparatus for drying substances such as peat, and the objects of my invention are to provide an auxiliary apparatus to be used in connection with any of the ordinary forms of driers which drive a certain quantity of moisture from the peat in the form of steam, further objects being to make the apparatus cheap and simple in construction and such that the quantity of moisture driven from the peat may be regulated as desired; and it consists essentially of a pan or receptacle substantially in the form of a series of steps, said pan being suspended from a suitable frame work by chains, rods or other swinging suspension, a steam box located beneath the pan, steam inlets and outlets, and suitable peat feeding attachments and supporting frame; the various parts being constructed and arranged in detail, so far as the invention has at present been completed, as hereinafter more particularly described.

Figure 1:
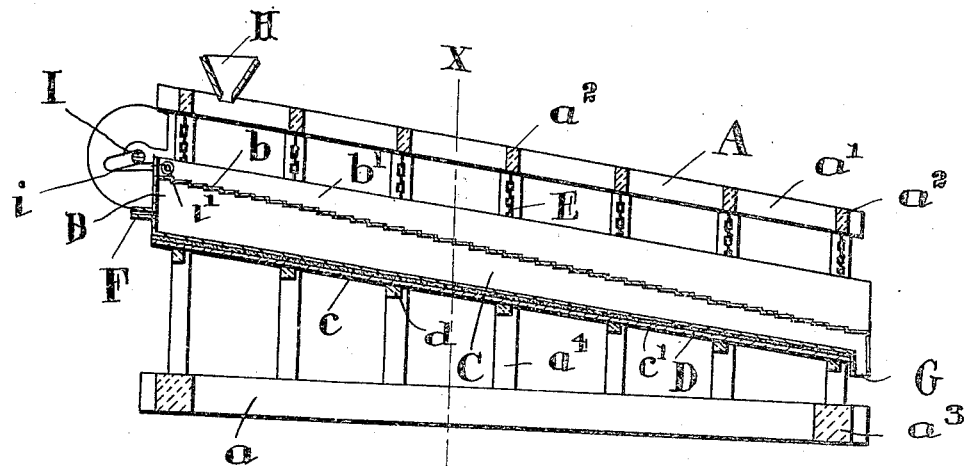
Figure 2:
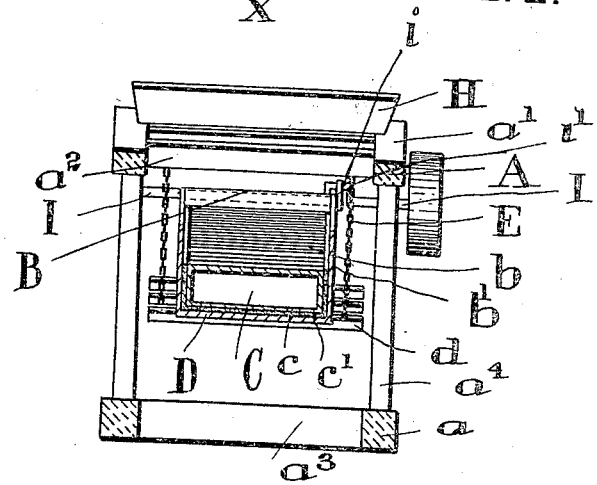

In the drawings, Figure 1 is a longitudinal section of my apparatus. Fig. 2 is a transverse section on the line X—X, Fig. 1.

In the drawings, like letters of reference indicate corresponding parts in each figure.

It may first be explained that the peat on leaving the driers of the class described is only partially dried and contains a large amount of steam which if the peat is left in piles will gradually be condensed into water and will remain as such in the mass of peat.

The particular object of this invention, is therefore, to stir up the peat when it comes out of the ordinary drier and at the same time keep it warm, thereby preventing the condensation of the steam and giving it access to the air to enable it to pass off. With this end in view, I have constructed the device as shown, and in which—

A is a suitable framework consisting of longitudinal base pieces $a$, sloping longitudinal upper beams $a'$, cross pieces $a^2$, and transverse base pieces $a^3$, the upper and lower portions of the frame being suitably connected by the uprights $a^4$.

B is the pan into which the peat to be further dried is fed, preferably from the trough H. This pan consists of a series of steps $b$, the object of which is to continuously force the peat forward and prevent its piling up in one place in its descent. The pan in its general direction slopes from inlet to outlet. Side walls $b'$ are provided to prevent the peat from falling from the sides in its descent.

Below the steps $b$ is located a steam box C, the upper portion of which is formed by the bottom of the pan and the lower portion is formed by a sheet of galvanized iron or other suitable material $c$. A layer of asbestos or other heat non-conducting material $c'$ is located beneath the steam box and to the sides thereof, and the whole box is contained in an outer casing D, preferably made of wood or like material. The step, box, pan and casing are provided with cross-pieces $d$ extending underneath the wooden outside casing and chains E extend from the cross-pieces $a^2$ of the frame to the cross-pieces $d$, thereby suspending the pan and steam box.

F is a steam inlet and G is a steam outlet for the box.

Suitable means are provided for oscillating the suspended portions in a backward and forward direction, such as the crank $i$ on the shaft I, connected to the pan B by a link $i'$. The result will be that the peat as it falls on the pan will gradually work down to the bottom falling off the lower end as shown. At the same time steam from the exit of the boiler is passed into the steam box by the inlet F, escaping through the outlet G and the peat will consequently be kept at a temperature sufficiently high to prevent the steam from condensing and the continual motion and shaking up of the peat will enable the steam which has been formed and held therein to escape into the air and the result will be that the percentage of moisture contained by the peat when it has passed through the machine, will be greatly reduced.

What I claim as my invention is:—

1. A peat drier comprising a suspended casing and a removable pan therein formed with a series of steps over which the peat is adapted to pass, and means for heating the pan and means for reciprocating the casing.

2. A peat drier comprising a suspended casing and a removable pan therein formed with a series of steps over which the peat is adapted to pass, means for heating the pan, means for reciprocating the casing, and a layer of heat insulating material between the pan and the casing.

3. A peat drier comprising a casing formed on the bottom with a plurality of transverse crossbars, a frame work flexible members extending through the frame work to the cross bar, and a removable pan in the casing over which the peat is adapted to pass, means for heating the pan, and means for reciprocating the casing.

In witness whereof I have hereunto set my hand in the presence of two witnesses.

CHARLES ALBERT MATHESON.

Witnesses:
 RUSSEL S. SMART,
 WM. A. WYMAN.